United States Patent [19]

Feld

[11] Patent Number: 5,205,657
[45] Date of Patent: Apr. 27, 1993

[54] THRUST CAGE ROLLER CIRCLE

[75] Inventor: Gregory N. Feld, Franklin, Wis.

[73] Assignee: Bucyrus-Erie Company, South Milwaukee, Wis.

[21] Appl. No.: 864,697

[22] Filed: Apr. 7, 1992

[51] Int. Cl.⁵ .................... F16C 19/30; F16C 33/58
[52] U.S. Cl. ...................... 384/621; 384/618; 384/623
[58] Field of Search ........ 384/593, 597, 618, 621–623, 384/571, 574

[56] References Cited

U.S. PATENT DOCUMENTS

| | | | |
|---|---|---|---|
| 355,376 | 1/1887 | Browne et al. | 384/593 |
| 555,655 | 3/1896 | Mossberg | 384/621 |
| 581,858 | 5/1897 | Grundler | 384/593 |
| 726,043 | 4/1903 | Freeburg | 384/593 |
| 3,199,329 | 8/1965 | Toth . | |
| 3,777,900 | 12/1973 | Brewer . | |
| 3,985,406 | 10/1976 | Baron | 384/618 |
| 4,582,436 | 4/1986 | Merron | 384/621 X |
| 4,723,852 | 2/1988 | Ehret | 384/621 X |
| 5,121,561 | 6/1992 | Palfreyman | 384/593 X |

FOREIGN PATENT DOCUMENTS 493305  4/1930  Fed. Rep. of Germany ...... 384/618

OTHER PUBLICATIONS

Torrington Catalog, p. 111, No date.
Torrington Catalog, V-Flat Thrust Bearings, p. 210, no date.

Primary Examiner—Thomas R. Hannon

[57] ABSTRACT

A roller circle for hoisting and excavating equipment has upper and lower spaced annular rails. A plurality of tapered rollers are disposed between the rails in rolling contact with bearing surfaces of the rails. Each of the rollers is mounted on a shaft. Inner and outer cages connect the projecting ends of the shafts and are joined together by through rods. A portion of the inner cage overlies a side face of a rail and a pad is disposed between the inner cage portion and the side of the rail. A second pad is disposed between the outer cage and the larger ends of the rollers. Thrust loads are transferred from the rollers to the outer cage and through the rods to the inner cage and then to the rail.

8 Claims, 1 Drawing Sheet

THRUST CAGE ROLLER CIRCLE

BACKGROUND OF THE INVENTION

This invention relates to roller circles for hoisting and excavating equipment and the like, and particularly to an improved roller circle using tapered rollers and a mechanism for accommodating the radial thrust loads to which the rollers are subjected Rollers circles are used to support a revolving framework upon a relatively stationary lower works. The revolving frame may mount excavating or hoisting equipment while the lower works is either stationary or adapted to travel from location to location for operation of the hoist or excavating equipment.

Particularly among larger machinery, it is typical to use tapered rollers whose axes of rotation are arranged radially relative to the center of rotation of the rotary frame and which rollers are in rolling contact with bearing surfaces of upper and lower annular rails. The lower rail is attached to the lower relatively stationary works, while the upper rail is attached to the revolving frame.

On large earth moving excavators such as draglines, shovels, wheel excavators, and other assortments of rotating machinery, the base or lower works of the machine rests stationary on the ground while the machine is in operation. The upper works of the machine that is mounted to the upper revolving frame is free to rotate to align the digging structure such as a boom and suspended bucket, or a boom handle and dipper. The roller circle supports the vertical loads resulting from the dead weight of the upper works and the live loads induced while digging, dumping, transferring, and so forth. Horizontal forces caused by the operation of the equipment are carried by a center pintle or pin. The center pin is usually mounted as part of the lower works and is connected to the upper works through a bearing or bushing to center the upper works to the lower works while the machine is rotated.

The typical roller circle consists of a large quantity of individual rollers that are pinned to rolled plates that serve as inner and outer cage frames. The cage frames maintain the spacing between adjacent rollers and align the axes of the rollers. The rollers ride on segmented rails. The lower rail is typically a continuous 360° while the upper rail may be continuous or partial. To provide a smooth rolling action and to prevent skidding of the rollers, tapered rollers in the form of truncated cones are used. Bearing surfaces are provided on the rails that mate with the tapered rollers. The taper is such that the upper and lower lines of rolling contact of the rollers cross at a common vertex on the center line of rotation of the revolving frame.

When a vertical load is applied to a tapered roller, the taper will induce an axial thrust load that will tend to squeeze the roller to the outside, away from the center line of rotation. The roller must be restrained axially to maintain its proper alignment with the upper and lower rails. Several methods of axially restraining the roller have been proposed in the past. In one method, the roller is provided with an integral flange on its internal smaller end. The flange contacts the inside edge of a rail which thereby restrains the roller from moving axially to the outside. A second integral flange on the outer larger end of the roller may be used in addition. The second flange provides additional security to keep the rollers in place while also providing a restraint to prevent the revolving frame from shifting off of the roller circle. Another approach uses an additional rail that engages the roller to the outside of the roller circle to carry the thrust load from the roller. An example of this latter approach is found in U.S. Pat. No. 4,582,436 issued Apr. 15, 1986, to Merron.

SUMMARY OF THE INVENTION

It is a principal object of this invention to eliminate the need for flanges on the rollers thereby reducing the spacing between rollers to allow the use of more rollers, and simplifying and reducing the cost of roller manufacture.

It is another object of the invention to eliminate the expense of a separate third rail and supporting structure.

The objects are achieved by utilizing the existing cage frame as the mechanism for taking up the thrust loads. This is broadly accomplished by having a portion of the inner cage overlie a side face of one of the upper or lower rails so that it can bear radially against the rail either directly or through a pad.

In summary, the invention involves a roller circle with upper and lower annular rails each having a bearing surface that is spaced from and opposes the bearing surface of the other rail. A plurality of tapered rollers are in rolling contact with the bearing surfaces of the rails, with each of the rollers being mounted on a shaft. An inner cage connects the ends of the shafts of adjacent rollers at the smaller ends of the rollers. The inner cage includes a portion that overlies a side face of a rail to transfer thrust loads from the rollers, through the cage, and to the rail.

The invention may further reside in such a roller circle with a second, outer cage connecting the opposite ends of the shafts of adjacent rollers, and means joining the outer cage to the inner cage so that thrust loads are transferred from the rollers to the outer cage and through the joining means to the inner cage.

Preferably, a pad is disposed on the inner cage portion and is adapted to bear against the side face of the rail. The pad may also be disposed between the inner cage and the smaller ends of the rollers. A second pad may be disposed between the outer cage and the larger ends of the rollers. The pads are preferably formed of a non-ferrous material.

The foregoing and other objects and advantages of the invention will appear in the detailed description that follows. In the description, reference is made to the accompanying drawings which illustrate a preferred embodiment of the invention.

DETAILED DESCRIPTION OF THE PREFERRED EMBODIMENT

Figure 1:
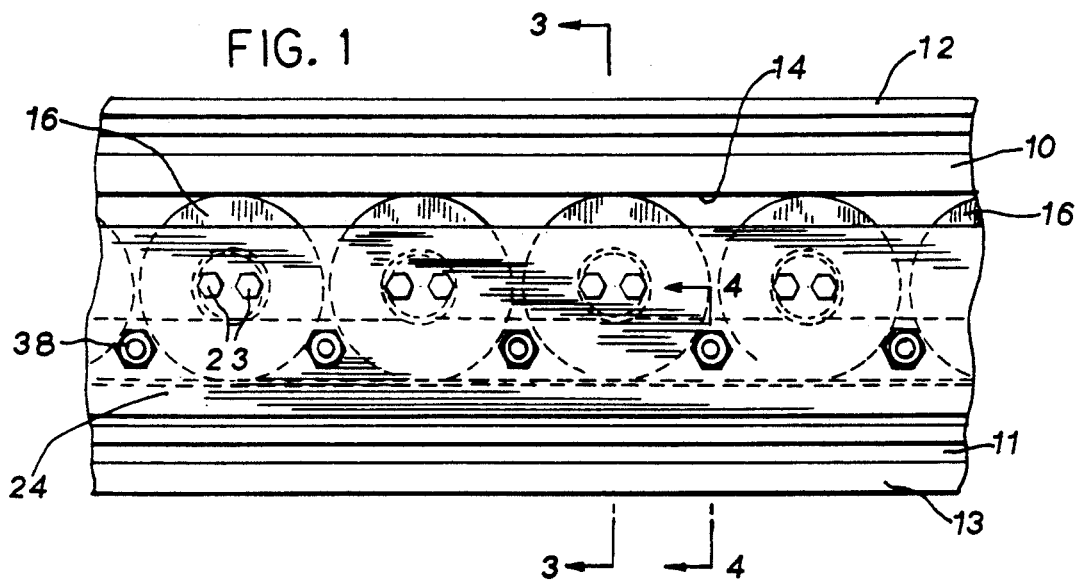
FIG. 1 is a view in elevation of a portion of the inner side of a roller circle according to the present invention.
Figure 2:
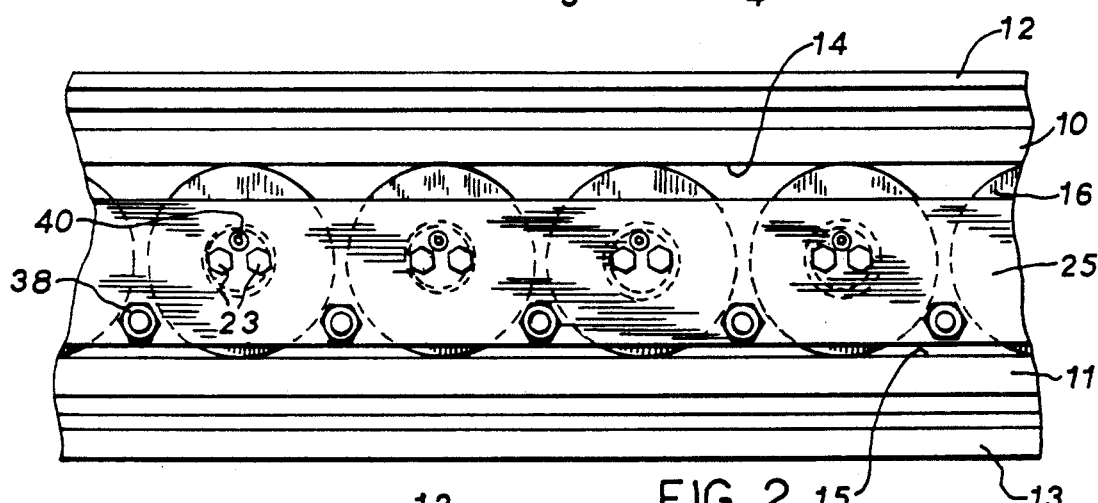
FIG. 2 is a view in elevation of a portion of the outer side of a roller circle in accordance with the invention.
Figure 3:
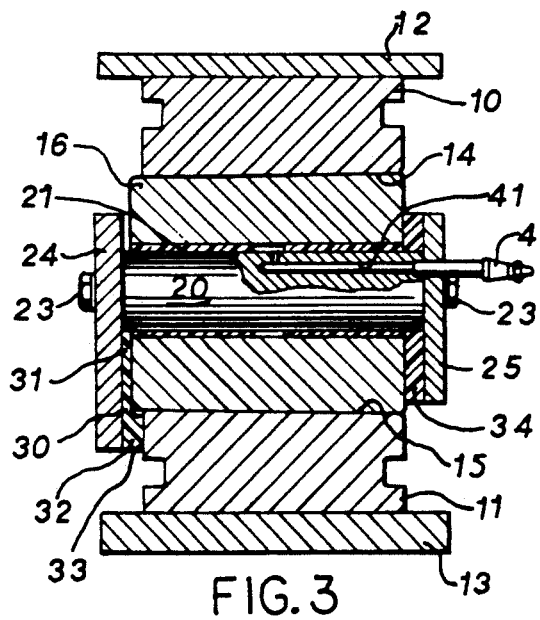
FIG. 3 is a view in vertical section taken in the plane of the line 3—3 of FIG. 1.
Figure 4:
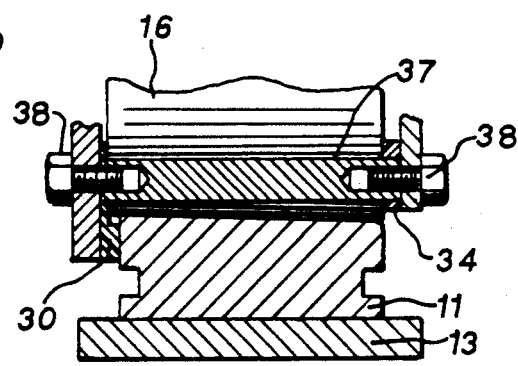
FIG. 4 is a partial view in vertical section taken in the plane of the line 4—4 of FIG. 1.

The roller circle includes upper and lower upright annular rails 10 and 11, respectively. The upper rail 10 is connected to a revolving frame exemplified by the plate 12 while the lower rail 11 is connected to a lower works exemplified by the plate 13. The upper and lower rails 10 and 11 are provided with respective bearing surfaces 14 and 15. Disposed between and in rolling contact with the bearing surfaces 14 and 15 are a plurality of rollers 16. The rollers 16 as well as the bearing surfaces 14 and 15 are tapered such that the lines of rolling contact between the rollers 16 and the bearing surfaces 14 and 15 will converge at the center line of rotation (not shown) of the roller circle.

Each of the rollers 16 is mounted on a roller shaft 20. A journal 21 formed of a natural or a synthetic resin material is disposed about the shaft 20 and within a central bore of the roller 16. The shafts 20 extend beyond the ends of the rollers 16 and are attached by pairs of bolts 23 to inner and outer cage plates 24 and 25, respectively. The inner and outer cage plates 24 and 25 maintain the spacing between the shafts and also maintain the axes of the shafts 20 along radial lines extending from the center of rotation of the roller circle. The inner cage plate 24 has a height such that a lower portion of the inner cage plate 24 overlies a side face of the lower rail 11.

An inner pad 30 has a relatively thin portion 31 disposed between the inner cage plate 24 and the smaller, inner end of each roller 16. The inner pad 30 also has a thick portion 32 that is disposed between the inner cage plate 24 and a vertical side face 33 of the lower rail 11. The side face 33 is generally normal to a plane that includes the axes of the shafts 20. An outer pad 34 is disposed between the outer cage plate 25 and the larger, outer end of each roller 16. A plurality of rods 37 extend through openings in the pads 30 and 34. The rods 37 mount bolts 38 received in the tapped ends of the rods 37, and extending through openings in the inner end outer cage plates 24 and 25. The rods 37 along with the shafts 20 maintain the axial position of the inner and outer cage plates 24 and 25 relative to each other. The rods 37 also hold the inner and outer pads 30 and 34 in place. The rods 37 may be round or have any other suitable cross-section.

A grease fitting 40 extends through the outer cage plate 25 and connects with a passage 41 in each shaft 20. The passage 41 connects to the outer perimeter of the shaft 20 and to the outer perimeter of the journal 21 through openings in the journal.

The roller circle utilizes the inner and outer cage plates to transmit the axial thrust load from the rollers to the upper or lower rail. The outward axial translation of the rollers is restrained by the outer cage plate 25. The outer pad 34 is utilized to reduce wear between the outer cage plate 25 and the large end of the rollers. The outward radial force on the outer cage plate 25 is carried by the rods 37 and the shaft 20 to the inner cage plate 24. The outward force is finally transmitted from the inner cage plate 24 to the lower rail 11. It could as well be transferred to the upper rail 10 instead by extending the inner cage plate 24 upwardly to overlap a side surface of the upper rail 10. The inner thrust pad 30 is employed to reduce wear to the surfaces of the lower rail 11, the inner cage plate 24, and the small end of the roller 16.

The rails and rollers are typically made of a ferrous material. Therefore, the pads 30 and 34 are preferably made of a nonferrous material. The pads will significantly reduce the wear of the roller ends and rail surfaces. The use of nonferrous materials for the thrust pads reduces the potential for spalling of the rolling surfaces caused by contamination of these surfaces and resulting from the scrubbing together of ferrous materials in the rollers and rails.

Although the inner and outer cage plates are shown as single members, they can be made of several curved plates joined together to form a circle. Also, the portion of the inner cage plate that overlies the rail may be a separate member attached to the inner cage rather than being integral with the inner cage plate. The rods 37 may be replaced by through bolts mounting nuts on each end surrounded by a spacer tube that extends between the inner and outer cage plates.

I claim:

1. A roller circle, comprising:
   upper and lower arcuate rails each having a bearing surface that is spaced from and opposes the bearing surface of the other rail;
   a plurality of tapered rollers in the space between the rails and in rolling contact with the bearing surfaces, each roller being mounted on a shaft; and
   an inner cage connecting the ends of the shafts of adjacent rollers at the smaller ends of the rollers,
   said inner cage including a portion that overlies a side face of one of said rails and engages said side face and transfers thrust loads from the rollers, through the cage, and to the rail.

2. A roller circle in accordance with claim 1 together with an outer cage connecting the ends of the shafts of adjacent rollers at the larger ends of the rollers, and radial members joining the inner cage with the outer cage so that thrust loads are transferred from the rollers to the outer cage and through the members to the inner cage.

3. A roller circle in accordance with claim 2 wherein the overlying portion of the inner cage includes a pad disposed against the side face of said one rail.

4. A roller circle in accordance with claim 2 together with a pad disposed between the larger end of the rollers and the outer cage.

5. A roller circle, comprising:
   a lower arcuate rail having a bearing surface;
   an upper arcuate rail having a bearing surface spaced from and opposing the bearing surface of the lower rail;
   a plurality of tapered rollers arrayed in a circle between the rails and in rolling contact with the bearing surfaces of the two rails, each of said rollers being rotatably mounted on a shaft;
   an inner cage member connecting the ends of the shafts of adjacent rollers at the smaller ends of the rollers; and
   a pad disposed against the inner cage member and engaging with a face of one of said rails that is normal to the plane of the axes of the shafts.

6. A roller circle in accordance with claim 5 together with an outer cage member connecting the opposite ends of the shafts of adjacent rollers, and a pad disposed between the outer cage member and the larger ends of the tapered rollers.

7. A roller circle in accordance with claim 6 together with a plurality of elongated members joining the inner and outer cage members and the pads together.

8. A roller circle in accordance with claim 7 wherein the pads are formed of a non-ferrous bearing material.

* * * * *